United States Patent [19]

Braca et al.

[11] Patent Number: 5,026,675
[45] Date of Patent: Jun. 25, 1991

[54] POLYMERIZATION CATALYST, THE PROCESS FOR ITS PREPARATION AND ITS USE IN ETHYLENE HOMO AND COPOLYMERIZATION

[75] Inventors: Giuseppe Braca, Pisa; Alessandro Ricci, Cascina; Glauco Sbrana, Pisa; Maurizio Brunelli, San Donato Milanese; Aldo Giusti, Lucca; Guglielmo Bertolini, Pavia; Anna M. R. Galletii, Cascina, all of Italy

[73] Assignee: Eniricerche S.p.A., Milan, Italy

[21] Appl. No.: 506,845

[22] Filed: Apr. 10, 1990

[30] Foreign Application Priority Data

Apr. 18, 1989 [IT] Italy .............................. 20186 A/89

[51] Int. Cl.$^5$ .............................................. C08F 4/26
[52] U.S. Cl. .................................. 502/159; 502/162; 502/167
[58] Field of Search ......................... 502/159, 162, 167

[56] References Cited

U.S. PATENT DOCUMENTS 3,933,770 1/1976 Ikeda et al. ......................... 502/159
4,290,918 9/1981 Bayer et al. ......................... 502/159

Primary Examiner—Patrick P. Garvin
Assistant Examiner—Brent M. Peebles

Attorney, Agent, or Firm—Oblon, Spivak, McClelland, Maier & Neustadt

[57] ABSTRACT

A catalyst active in the polymerization of ethylene or the copolymerization of ethylene with unsaturated monomers consists of a nickel complex catalyst bonded to a polystyrene substrate, and definable by the general formula (I):

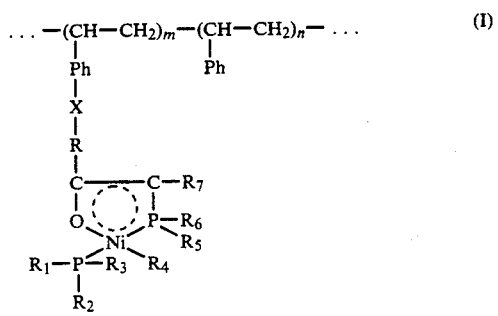

where R, $R_1$, $R_2$, $R_3$, $R_4$, $R_5$, $R_6$ and $R_7$ have the meanings given in the description.

The preparation is described of the catalyst and its use in the polymerization of ethylene and the copolymerization of ethylene with other unsaturated monomers.

7 Claims, No Drawings

POLYMERIZATION CATALYST, THE PROCESS FOR ITS PREPARATION AND ITS USE IN ETHYLENE HOMO AND COPOLYMERIZATION

This invention relates to a nickel complex catalyst bounded to a polystyrene substrate, its preparation and its use in the homopolymerization of ethylene and in the copolymerization of ethylene with another unsaturated monomer in the production of high molecular weight polymers.

Ethylene and alpha olefins in general are traditionally polymerized by Ziegler catalysts generally formed from an iodide or organometallic compound of the elements of groups I to III of the periodic table, and a compound of a transition metal of groups IV to VI of the periodic table. The patent literature also describes unconventional catalysts based on certain nickel complexes which are able to polymerize olefins, and described for example in patent applications DE No. 3,228,865 and EP No. 137,389.

A new class of catalysts has now been discovered, consisting of nickel complexes bonded to a polystyrene substrate, which have an unusual range of characteristics in relation to their ethylene polymerization capacity or their ability to produce copolymers of ethylene with another alpha-olefin or with an unsaturated vinyl and acrylic monomer, and in relation to the physical shape of the produced polymers, which unexpectedly take the form of spherical granules. In accordance therewith, according to one aspect, the present invention provides a nickel complex catalyst bonded to a polystyrene substrate, which is active in the polymerization of ethylene and in the copolymerization of ethylene with another unsaturated monomer, and is definable by the formula (I):

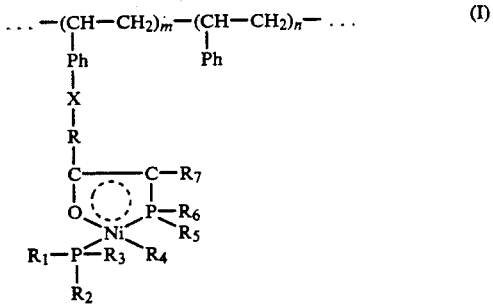

where:
Ph=phenyl;
X=—O—, —N=N—, a linear or branched $C_1$-$C_{10}$ alkylene, or a direct bond;
R=$C_6$-$C_{12}$ aryl;
$R_2$, $R_3$, $R_4$, $R_5$ and $R_6$ are independently chosen from $C_1$-$C_{20}$ alkyl, $C_1$-$C_{20}$ alkoxy, $C_6$-$C_{12}$ aryl, $C_6$-$C_{12}$ aryloxy, $C_1$-$C_{20}$ alkyl-$C_6$-$C_{12}$ aryl, $C_6$-$C_{12}$ aryl-$C_1$-$C_{20}$ alkyl and $C_3$-$C_8$ cycloalkyl groups; said groups possibly carrying one or more substituents chosen from halogen, hydroxy, dimethylamino, cyano, $C_1$-$C_{20}$ alkoxy, $C_6$-$C_{12}$ aryloxy, $C_6$-$C_{12}$ aryl or $C_1$-$C_{20}$ alkyl;
$R_1$ is hydrogen or any of $R_2$-$R_6$;
$R_7$ is H or has the same meaning as $R_1$-$R_6$; and
m and n are numbers which depend on the molecular weight of the polystyrene, the ratio n/m varying from 1/1 to 100/1.

In the preferred embodiment R is phenyl; X is a direct bond or the group —N=N—; $R_1$, $R_2$, $R_3$, $R_4$, $R_5$ and $R_6$ are phenyl, $R_7$ is hydrogen and the ratio n/m varies from 15/1 to 40/1.

The catalyst (I) can be prepared by a process generally comprising the following steps.

In a first reaction step the polystyrene is reacted with a metalating agent (M) to form a polystyrene metalate:

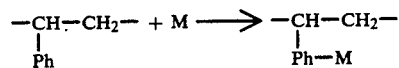

Useful for this purpose are normal solid macroporous polystyrenes, possibly crosslinked with up to about 20% of divinylbenzene by weight. In the preferred embodiment a polystyrene crosslinked with 2-15% of divinylbenzene by weight is used. Metalating agents suitable for this purpose are $C_1$-$C_{12}$ alkyls, or hydrides or amides of alkaline metals, particularly sodium, lithium or potassium. Specific examples of such metalating agents are Li-n-butyl, Li-sec-butyl, Na-amyl, Na-cumyl, K-cumyl, Li-diisopropylamide and Na-H. These metalating agents can be used in combination with typical metalation activators such as N,N,N',N'-tetramethylethylenediamine, potassium t-butylate and diazodicyclooctane. In practice, a solution or suspension of polystyrene is firstly prepared in an inert inorganic solvent. If a suspension is prepared the polystyrene is conveniently in the form of granules having a size of the order of 0.1-1 mm. Organic solvents useful for this purpose comprise aliphatic, cycloaliphatic or aromatic liquid hydrocarbons such as cyclohexane and toluene, and liquid ethers such as tetrahydrofuran. The metalation reaction occurs by bringing the metalatable polymer and the chosen metalating agent, possibly plus an activator for the metalating agent, into mutual contact in the organic solvent, operating at a temperature of between about 0° and 150° C. and preferably between 40° and 80° C., for a time generally of between 0.5 and 48 hours. The ratio of metalating agent to the organic polymer varies according to the desired extent of metalation, 0.5-10 moles of metalating agent being normally used per polystyrene monomer unit. When operating under the aforesaid conditions a metalation yield of between 1 and 20% is generally obtained, calculated on the metalating agent used. The best results are obtained using lithium alkyls as metalating agents, or lithium alkyls in combination with one of the aforesaid activators, in a molar ratio generally between 1/0.1 and 1/10 and preferably between 1/0.5 and 1/1. The polystyrene metalate is conveniently separated from the reaction mixture, and washed with solvent (such as cyclohexane or tetrahydrofuran) to remove the unaltered metalating agent.

In the second reaction step the polystyrene metalate is reacted with a halogen acyl methylene (or methylene substituted) phosphine as phosphinating agent, to obtain a polystyrene phosphinate in accordance with the equation:

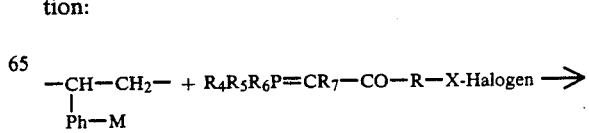

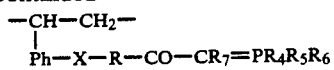

This reaction is conveniently effected by contact between the halogen acyl methylene (or methylene substituted) phosphine and the polystyrene metalate suspended in an inert organic solvent, with formation of the metal halide as reaction co-product. Examples of halogen acyl methylene phosphines suitable for the purpose are: triaryl phosphine p-bromo benzoyl methylene, trialkylphosphine p-bromo benzoyl methylene, trialkyl or triaryl phosphite p-bromo benzoyl methylene, trialkyl or triphenyl phosphine p-diazo benzoyl methylene chloride and relative naphthoyl derivatives. Triphenyl phosphine p-bromo benzoyl methylene is particularly preferred for the purpose. Organic solvents suitable for the purpose are those indicated for the polystyrene metalation step. Conveniently, between 2 and 10 moles of phosphinating agent are used per gram atom of metal bonded to the polystyrene, at a temperature of between 20° and 80° C. Under these conditions the reaction goes to completion or substantial completion in a time of between 1 and 48 hours. The polystyrene phosphinate obtained in this manner is separated from the reaction mixture, washed with solvent such as tetrahydrofuran to remove any unaltered phosphinating agent and then with an alcohol such as methanol to remove the metal halide co-produced in the reaction.

Alternatively the second step of the process can be effected by firstly reacting the polystyrene metalate with a halogen acyl methyl (or methyl-substituted) followed by halogenation and phosphination of the obtained reaction product as stated hereinafter.

In the third reaction step the polystyrene phosphinate is brought into contact and reacted with a phosphine $PR_1R_2R_3$ and with a zerovalent nickel ($Ni^0$) compound or complex to produce the catalyst of the invention in accordance with the equation:

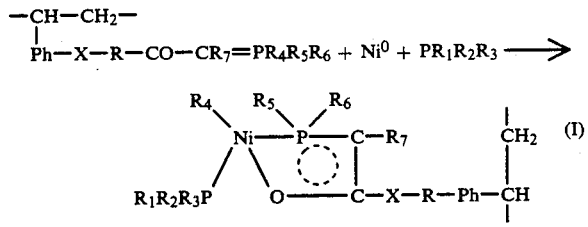

Examples of phosphines useful for the purpose are triarylphosphines, trialkylphosphines, arylalkylphosphines and triaryl and trialkyl phosphites. Of these, triphenylphosphine is particularly preferred. The nickel compounds or complexes suitable for the purpose are zerovalent nickel compounds or complexes such as nickel-bis-cyclooctadiene, nickel-bis-acrylonitrile and nickel-cyclooctatetraene.

In particular, in the third reaction step the polystyrene phosphinate is suspended in an inert hydrocarbon solvent such as an aromatic solvent, eg toluene, in which the phosphine $PR_1R_2R_3$ is dissolved, the zerovalent nickel compound or complex then being gradually added to the obtained suspension operating at low temperature, for example about 0° C. When the addition of the zerovalent nickel compound or complex is complete, the reaction mixture is left stirring for several hours, for example 24 hours, allowing the temperature to rise to ambient. In this manner the catalyst of the present invention is obtained in the form of beads in the relative mother liquor. The beads are generally of orange-brown colour with a nickel content, as metal, in the catalyst varying from 0.2 to 5.0% by weight. If desired the catalyst can be separated from the mother liquor by evaporating the solvent at low temperature, for example of the order of 50° C., operating under vacuum.

The catalyst is sensitive to oxygen and moisture, thus all the operations involved in its preparation must be conducted in an inert atmosphere, such as argon.

The following REACTION SCHEMES I, II and III show examples of the preparation of specific catalysts of the present invention. Specifically, REACTION SCHEME I represents a process for preparing the catalyst of formula (I) in which the substituents R, $R_1$, $R_2$, $R_3$, $R_4$, $R_5$ and $R_6$ are phenyl, $R_7$ is a hydrogen atom and X is a direct bond [catalyst (Ia)]. In this scheme, the polystyrene (II) is metalated with lithium n-butyl operating in cyclohexane in the presence of the activator N,N,N',N'-tetramethylethylene diamine, to give the polystyrene metalate (III). This latter is then reacted with triphenylphosphine-p-bromobenzoylmethylene (IV) operating in tetrahydrofuran and eliminating the lithium bromide, to give the polystyrene phosphinate (V). Finally the polystyrene phosphinate (V) is reacted with nickel-bis-cyclooctadiene and triphenylphosphine to give the catalyst (Ia) according to the present invention.

REACTION SCHEME II represents an alternative process for preparing the catalyst (Ia). Specifically, according to the scheme the polystyrene metalate (III) and p-bromo-phenylmethylketone (VII) are reacted, with elimination of the lithium bromide, to give the compound (VII) which is brominated to the methyl operating in ether in the presence of aluminium chloride, to give the compound (VIII). This latter is treated with triphenylphosphine with elimination of hydrobromic acid, to give the polystyrene phosphinate (V). This polystyrene phosphinate (V) is then reacted with nickel-bis-cyclooctadiene and triphenylphosphine, similarly to the preceding scheme, to give the catalyst (Ia).

REACTION SCHEME III represents a process for preparing the catalyst of formula (I) in which the substituents R, $R_1$, $R_2$, $R_3$, $R_4$, $R_5$ and $R_6$ are phenyl, $R_7$ is a hydrogen atom and X is the group —N=N— [catalyst (Ib)]. According to this scheme p-aminoacetophenone (IX) is firstly subjected to diazotation to give the compound (X), which is used for substitution of the polystyrene metalate (III). The reaction product (VI) obtained in this manner is brominated at the methyl to give the corresponding brominated product (XII), which is interacted with triphenylphosphine with elimination of hydrobromic acid, to give the polystyrene phosphinate (XIII). This polystyrene phosphinate (XIII) is then reacted with nickel-bis-cyclooctadiene and triphenylphosphine to give the catalyst (Ib) according to the present invention.

REACTION SCHEME I
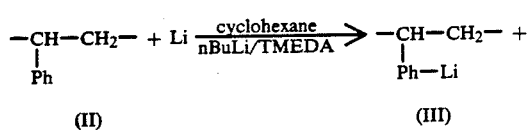
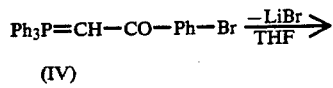
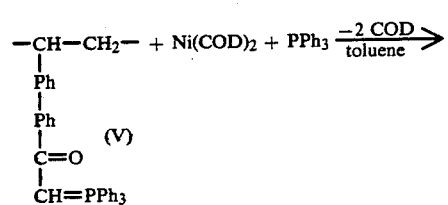
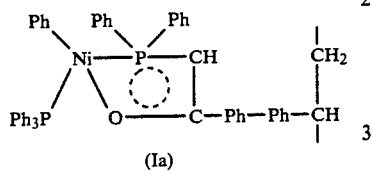
Ph = phenyl
nBuLi = lithium n-butyl
Ni(COD)₂ = nickel-bis-cyclooctadiene
TMEDA = N,N,N',N'-tetramethylethylenediamine
THF = tetrahydrofuran
REACTION SCHEME II
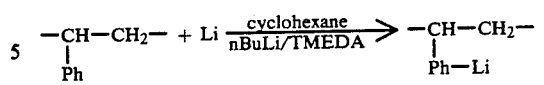
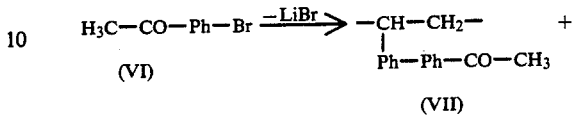
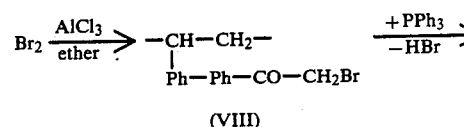
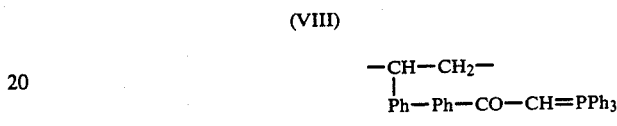
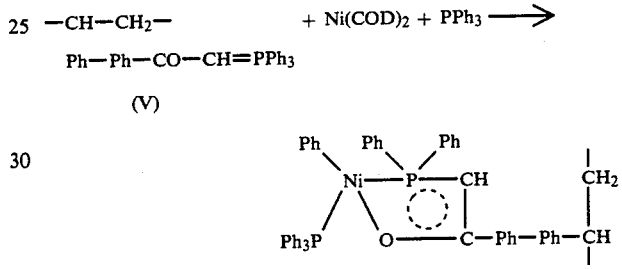
Ph = phenyl
nBuLi = lithium n-butyl
Ni(COD)₂ = nickel-bis-cyclooctadiene
TMEDA = N,N,N',N'-tetramethylethylenediamine
REACTION SCHEME III
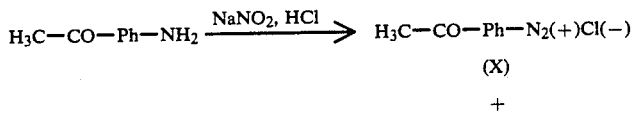
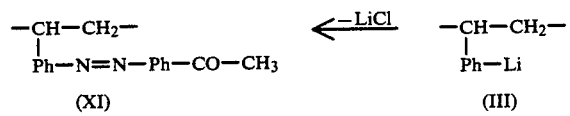
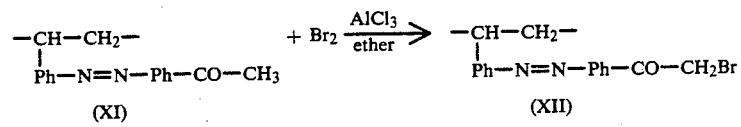
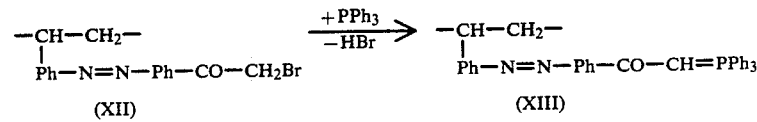
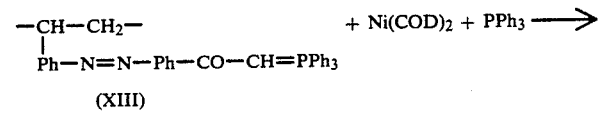

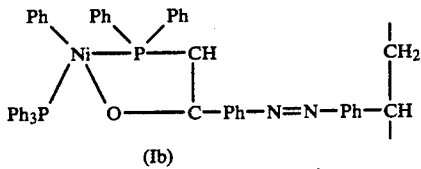

(Ib)

Ph = phenyl
Ni(COD)₂ = nickel-bis-cyclooctadiene

The catalyst of the present invention is active in the homopolymerization of ethylene and in the copolymerization of ethylene with another unsaturated monomer. The expression "another unsaturated monomer" as used in the present description means another alpha-olefin or an unsaturated acrylic or vinyl monomer. Examples of such unsaturated monomers which can be copolymerized with ethylene are: propylene, $C_1$–$C_{12}$ alkyl esters of acrylic or methacrylic acid, such as methyl or ethyl acrylate or methacrylate, vinyl acetate, acrylonitrile and styrene. The ethylene polymerization or copolymerization can be effected by the normal polymerization methods, however in the preferred embodiment the method used is that of suspension in a liquid organic diluent, normally chosen from aliphatic, cycloaliphatic and aromatic hydrocarbons such as hexane and toluene. Conveniently, ethylene or a mixture of ethylene and another unsaturated monomer is fed to said liquid reaction medium at a temperature of between about 10° C. and about 100° C. at atmospheric or higher pressure, possibly in the presence of a molecular weight regulator such as hydrogen. In the preferred embodiment the polymerization temperature is chosen in the range of ambient (20°–25° C.) to 80° C. and the pressure in the range of atmospheric to 100 bar. Operating under these conditions, solid ethylene polymers and copolymers are obtained of molecular weight dependent on the polymerization conditions, and useful for practical purposes. The polymers and copolymers are surprisingly obtained in the form of regular beads having a diameter of the order of 1–10 mm. This is of great practical interest in that it dispenses with the need for melting and granulation of the polymer, as is normally used in the art to give the polymer a physical form suitable for subsequent processing and transformation. The following examples are given to better illustrate the invention.

EXAMPLES 1–10

In Examples 1–10 the polymerization catalyst is synthesized in accordance with REACTION SCHEME I. More specifically, in this synthesis 2.5 g of polystyrene of different degrees of crosslinking with divinylbenzene are suspended in 20 ml of cyclohexane. A mixture of 15 ml of 2M lithium n-butyl in hexane and 3.6 ml of N,N,N',N'-tetramethylethylenediamine is added to the resultant suspension by means of a syringe. The reaction mixture is left stirring for about 24 hours at 60° C. After this time the reaction mixture is cooled and the polystyrene lithiate is washed several times with deoxygenated cyclohexane and tetrahydrofuran to remove the unreacted lithium n-butyl, until the resultant solution no longer gives a basic hydrolysis reaction.

The polystyrene lithiate obtained in this manner is suspended in about 50 ml of anhydrous tetrahydrofuran and 1.76 g of triphenylphosphine-p-bromobenzoylmethylene (molecular weight 459) are added, and the mixture left to react at ambient temperature (20°–25° C.) for about 2 days. The polystyrene phosphinate obtained in this manner is filtered off and washed several times with tetrahydrofuran to remove any unreacted triphenylphosphine-p-bromobenzoylmethylene and with methanol to remove the lithium bromide and any lithium still bonded to the polystyrene. The polystyrene phosphinate is reacted with nickel-bis-cyclooctadiene and triphenylphosphine substantially as described by Keim W., Kowaldt F., Goddar R. and Kruger C. in Angew. Chem. Inst. Engl. Ed., 17 (6), 466 (1978). Specifically, the polystyrene phosphinate is suspended in toluene containing the dissolved triphenylphosphine. A solution of nickel-bis-cyclooctadiene in toluene is added to this suspension dropwise operating at about 0° C. When the addition is complete stirring is continued for 24 hours, allowing the temperature to rise to ambient.

EXAMPLE 11

For comparison purposes a catalyst in the form of a nickel catalyst not bonded to polystyrene is prepared in accordance with the following reaction scheme:

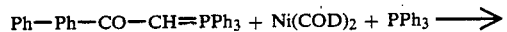

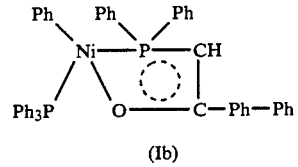

(Ib)

where Ph=phenyl
Ni(COD)₂=nickel-bis-cyclooctadiene

Said comparison catalyst is prepared in the following manner. 3.6 ml of 0.08M lithium-phenyl [prepared as described by Jones and Gilman, Org. Reactions 6, 353 (1951)] in anhydrous ether are added to a solution of 20 ml of toluene and 1.2 g of triphenylphosphine-p-bromobenzoylmethylene, and the mixture is left stirring at ambient temperature for about 24 hours. A few ml of methanol are then added to eliminate any unreacted lithium-phenyl and the mixture filtered. The filtrate is evaporated to dryness, the residue taken up in about 5 ml of hot toluene and petroleum ether added to precipitate the phosphine. This latter (100 mg) is then reacted with nickel-bis-cyclooctadiene (167 mg) and triphenylphosphine (205 mg) operating under the conditions previously described for the catalyst bonded to polystyrene. Table I shows for the catalysts of Examples 1 to 10 the type of polystyrene used [specifically the weight percentage of crosslinking divinylbenzene (DVB) present in the polymer], the phosphorus quantity (P wt %) present in the polystyrene phosphinate and the quantity (mg) of polystyrene phosphinate, nickel-bis-cyclooctadiene Ni(COD)₂ and triphenylphosphine PPh₃ used to prepare the catalyst.

TABLE I

| Ex. No. | Polystyrene wt % DVB | P wt % | Polystyrene phosphinate (mg) | Ni(COD)₂ (mg) | PPh₃ (mg) |
|---|---|---|---|---|---|
| 1 | 8 | 1.34 | 250 | 60 | 63 |
| 2 | 8 | 1.34 | 250 | 60 | 63 |
| 3 | 8 | 1.34 | 265 | 103 | 80 |
| 4 | 4.5 | 0.94 | 281 | 128 | 111 |
| 5 | 1.75 | 0.92 | 452 | 346 | 146 |
| 6 | 8 | 1.34 | 257 | 88 | 105 |
| 7 | 8 | 1.34 | 264 | 111 | 112 |
| 8 | 8 | 1.34 | 239 | 127 | 104 |
| 9 | 8 | 1.34 | 205 | 126 | 109 |
| 10 | 8 | 1.34 | 268 | 100 | 82 |

NB: in Example 2 the solid catalyst washed with toluene was used.
In all other cases the solid catalyst suspended in the mother solution from the synthesis process was used.

The catalysts obtained in Examples 1 to 10 and in Example 11 are used for ethylene polymerization or for ethylene copolymerization with another unsaturated monomer in accordance with the following procedure. A stainless steel rocking pressure vessel of capacity 125 ml fitted with a pressure gauge is used. Loading is effected by feeding the solid catalyst with the mother solution into the pressure vessel under an argon atmosphere. Then after putting the apparatus under vacuum by a mechanical pump the polymerizable monomer or monomers are added. At this point the pressure vessel is placed in an oil bath fitted with a mechanical stirring system and temperature-controlled at the reaction temperature, and is left therein for a predetermined time. In some cases the pressure vessel is repeatedly pressurized with ethylene. On termination of the test the pressure vessel is removed from the bath and cooled to ambient temperature. After releasing the gas the pressure vessel is opened and the reaction products recovered. Table II summarizes the polymerization conditions.

TABLE II

| Cat. Ex. No. | solvent (20 ml) | pressure (atm) | time (hours) | temp (°C.) | ΔP (atm) |
|---|---|---|---|---|---|
| 1 | toluene | 50 | 6 | 60 | 95 |
| 2 | toluene | 50 | 4 | 60 | 15 |
| 3 | toluene | 50 | 2 | 60 | 100 |
| 4 | toluene | 20 | 18 | 60 | 60 |
| 5 | toluene | 50 | 20 | 60 | 35 |
| 6 | toluene | 75 | 3 | 60 | 50 |
| 7 | toluene | 15 | 18 | 60 | 5 |
| 8 | toluene | 50 | 5 | 60 | 45 |
| 9 | n-hexane | 50 | 24 | 60 | 50 |
| 10 | toluene | 10 | 20 | 60 | — |
| 11 | toluene | 50 | 24 | 60 | 10 |

The pressure (atm) stated in the table is the pressure of the initially loaded ethylene (Examples 1 to 5, 8, 9 and 11) or of the loaded propylene (example 10). The pressure stated in Example 6 derives from ethylene (50 atm) and hydrogen (25 atm). The pressure stated in Example 7 derives from ethylene (7.5 atm) and propylene (7.5 atm). In Example 8, 5 ml of methyl methacrylate were also fed into the pressure vessel.

In the table ΔP (atm) indicates the total atmospheres of ethylene absorbed.

In Example 1, 45.5 g of polyethylene are obtained in the form of compact off-white beads of various diameters. The polymer produced has the following characteristics: Xray analysis confirms that the polymer is polyethylene, Tm (melting point)=135°±1° C.; Tc (crystallization temperature)=117°±1° C.; MFI (melt flow index) (2.16 kg)—does not flow; MFI (21.6 kg)=6.3 g/10 min; density=0.954 g/ml.

In Example 2, 3.5 g of polyethylene are obtained in the form of very white beads. The polymer produced has the following characteristics: Xray analysis confirms that the polymer is polyethylene; Tm=135°±1° C.; Tc=117°±1° C.; MFI (2.16 kg)—does not flow; MFI (21.6 kg)—does not flow; density=0.95 g/ml. In Example 3, 50.0 g of polyethylene are obtained in the form of compact white beads of various dimensions. The polymer produced has the following characteristics: Xray analysis confirms that the polymer is polyethylene; Tm=135°±1° C.; Tc=117°±1° C.; MFI (2.16 kg)—does not flow; MFI (21.6 kg)=6.7 g/10 min; density=0.957 g/ml.

In Example 4, 14.5 g of polyethylene are obtained in the form of off-white beads less compact and regular than in the preceding examples. The polymer produced has the following characteristics: Xray analysis confirms that the polymer is polyethylene; Tm=135°±1° C.; Tc=117°±1° C.; MFI (2.16 kg)—does not flow; MFI (21.6 kg)=10.8 g/10 min.

In Example 5, 11.2 g of polyethylene are obtained in the form of irregular poorly compact beads. The polymer produced has the following characteristics: Xray analysis confirms that the polymer is polyethylene; Tm=135°±1° C.; Tc=117°±1° C.; MFI (2.16 kg)—does not flow; MFI (21.6 kg)—does not flow.

In Example 6, 14.8 g of polyethylene are obtained in the form of small, very regular beads. The polymer produced has the following characteristics: Xray analysis confirms that the polymer is polyethylene; Tm=135°±1° C.; Tc=117°±1° C.; MFI (2.16 kg)=0.08 g/10 min; MFI (21.6 kg)=21.5 g/10 min.

In Example 7 a gelatinous product in the form of a low molecular weight copolymer of ethylene and propylene. Tm=118°±1° C.; Tc=108°±1° C.

In Example 8, 22.1 g of an ethylene-methyl methacrylate copolymer are obtained. This copolymer is subjected to extraction with chloroform to give an extract and a residue. The starting copolymer, the extract and the residue have identical IR spectra and indicate the presence of methyl methacrylate. The following characteristics are also determined: MFI (2.16 kg)—does not flow; MFI (21.6 kg)=2.2 g/10 min.

In Example 9, 29.3 g of polyethylene are obtained in the form of off-white beads. The polymer produced has the following characteristics: Xray analysis confirms that the polymer is polyethylene; Tm=135°±1° C.; Tc=117°±1° C.; MFI (2.16 kg)—does not flow; MFI (21.6 kg)=0.36 g/10 min.

In Example 10 practically no polymer is obtained.

In Example 11 only liquid oligomers of ethylene are obtained.

EXAMPLE 12

The procedure is similar to that of Examples 1 to 10, using a polymerization catalyst obtained from 241 mg of a phosphinated (1.34% by wt of phosphorus) styrene-divinylbenzene resin (8% divinylbenzene), 51 mg of Ni(COD)₂, and 59 mg of triphenylphosphine. The polymerization run lasts 4 hours, upon a previous pressurizing step with ethylene up to 17 atmospheres and restoring the pressure with 10 atmospheres of ethylene and subsequently with 2.5, 4.0 and 3.0 atmospheres of propylene, with an overall ΔP of 17 atmospheres on completion of the polymerization run. 12 g of an ethylene-propylene copolymer are obtained, having an propylene content of 3% molar (NMR-determined), a melting point of 126.3° C., a density of 0.948 g/ml, and an intrinsic viscosity of 1.32.

EXAMPLE 13

The procedure is similar to that of Examples 1 to 10, using a polymerization catalyst obtained from 200 mg of a phosphinated (1.34% by weight of phosphorus) styrenedivinylbenzene resin (8% divinylbenzene), 50 mg of Ni(COD)$_2$, and 57 mg of diphenylphosphine PH(C$_6$H$_5$)$_2$. The polymerization run lasts 25 hours, on preliminarily pressurizing with ethylene up to 50 atmospheres, and restoring the pressure three times with ethylene, with a total ΔP of 111 atmospheres on completion of the polymerization run. There are obtained 40 g of an ethylene polymer, having a melting point of 133.8° C., a density of 0.950 g/ml, and an intrinsic viscosity of 6,52.

EXAMPLE 14

The procedure is similar to that of Examples 1 to 10, using a polymerization catalyst obtained from 200 mg of a phosphinated (1.34% by weight of phosphorus) styrene-divinylbenzene (8% divinylbenzene) resin, 64 mg of Ni(COD)$_2$, and 90 mg of a para-substituted triphenylphosphine having the formula P(C$_6$H$_5$-N(CH$_3$)$_2$)$_3$. The polymerization run lasts for 17 hours upon initially pressurizing with ethylene up to 50 atmospheres and restoring the pressure with ethylene, with a total ΔP of 60 atmospheres at the end of the polymerization run. There are obtained 26 g of an ethylene polymer, having a melting point of 135.2° C., a density of 0.955 g/ml and an intrinsic viscosity of 4.42.

We claim:

1. A nickel complex catalyst bonded to a polystyrene substrate, which is active in the polymerization of ethylene and in the copolymerization of ethylene with another unsaturated monomer, and is definable by the formula (I):

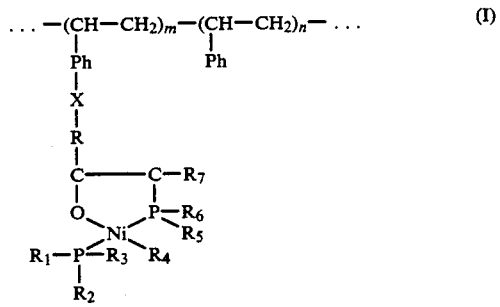

where:
Ph=phenyl;
X=—O—, —N=N—. a linear or branched C$_1$-C$_{10}$ alkylene, or a direct bond;
R=C$_6$-C$_{12}$ aryl;
R$_2$, R$_3$, R$_4$, R$_5$ and R$_6$ are independently chosen from C$_1$-C$_{20}$ alkyl, C$_1$-C$_{20}$ alkoxy, C$_6$-C$_{12}$ aryl, C$_6$-C$_{12}$ aryloxy, C$_1$-C$_{20}$ alkyl-C$_6$-C$_{12}$ aryl, C$_6$-C$_{12}$ aryl-C$_1$-C$_{20}$ alkyl and C$_3$-C$_8$ cycloalkyl groups; said groups possibly carrying one or more substituents chosen from halogen, hydroxy, dimethylamino, cyano, C$_1$-C$_{20}$ alkoxy, C$_6$-C$_{12}$ aryloxy, C$_6$-C$_{12}$ aryl or C$_1$-C$_{20}$ alkyl;
R$_1$ is hydrogen or any of R$_2$, R$_3$, R$_4$, R$_5$, R$_6$;
R$_7$ is H or has the same meaning as R$_1$-R$_6$; and
m and n are numbers which depend on the molecular weight of the polystyrene, the ratio n/m varying from 1/1 to 100/1.

2. A catalyst as claimed in claim 1, characterised in that in formula (I) R is phenyl; X is a direct bond or the group —N=N—; R$_1$, R$_2$, R$_3$, R$_4$, R$_5$ and R$_6$ are phenyl, R$_7$ is hydrogen and the ratio n/m varies from 15/1 to 40/1.

3. A process for preparing the catalyst claimed in claim 1 or claim 2, characterised in that:

in a first reaction step the polystyrene is reacted with a metalating agent (M) to form polystyrene metalate:

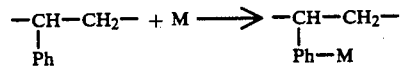

in a second reaction step the polystyrene metalate is reacted with a halogen acyl methylene (or methylene substituted) phosphine to form a polystyrene phosphinate:

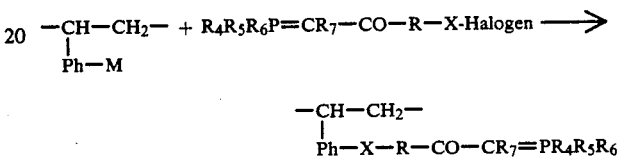

in a third reaction step the polystyrene phosphinate is reacted with a phosphine PR$_4$R$_5$R$_6$ and with a zerovalent nickel (Ni$^0$) compound or complex to produce the catalyst (I):

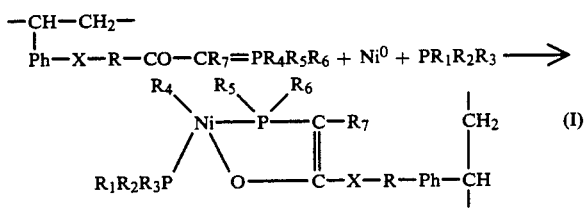

where R, R$_1$, R$_2$, R$_3$, R$_4$, R$_5$, R$_6$ and R$_7$ have the meanings given in claims 1 and 2.

4. A process as claimed in claim 3, characterised in that in the first step a solid polystyrene possibly cross-linked with up to about 20 weight % and preferably 2-15 weight % of divinylbenzene is used.

5. A process as claimed in claim 4, characterised in that in the second step the halogen acyl methylene phosphine is chosen from triarylphosphine p-bromo benzoyl methylene, trialkylphosphine p-bromo benzoyl methylene, trialkyl or triaryl phosphite p-bromo benzoyl methylene, trialkyl or triphenyl phosphine p-diazo benzoyl methylene chloride and relative naphthoyl derivatives, and is preferably triphenyl phosphine p-bromo benzoyl methylene.

6. A process as claimed in claim 4, characterised in that in the third step the phosphine is chosen from triarylphosphines, trialkylphosphines, arylalkylphosphines and triaryl and trialkyl phosphites and is preferably triphenylphosphine, the zerovalent nickel compound or complex being chosen from nickel-bis-cyclooctadiene, nickel-bis-acrylonitrile and nickel-cyclooctatetraene.

7. A process as claimed in claim 4, characterised in that in the second reaction step the polystyrene metalate is firstly reacted with a halogen acyl methyl (or methyl substituted), followed by halogenation and phosphination of the reaction product thus obtained.

* * * * *

UNITED STATES PATENT AND TRADEMARK OFFICE
CERTIFICATE OF CORRECTION

PATENT NO. : 5,026,675

DATED : June 25, 1991

INVENTOR(S) : Giuseppe Braca et al.

It is certified that error appears in the above-identified patent and that said Letters Patent is hereby corrected as shown below:

On the title page:
The last inventor's name is spelled incorrectly, should be,

--Anna M. R. Galletti--.

Signed and Sealed this

Seventeenth Day of November, 1992

*Attest:*

DOUGLAS B. COMER

*Attesting Officer*  *Acting Commissioner of Patents and Trademarks*